Feb. 15, 1938.  J. R. THORP  2,108,322
WEATHER GUARD
Filed Dec. 28, 1936  2 Sheets-Sheet 1
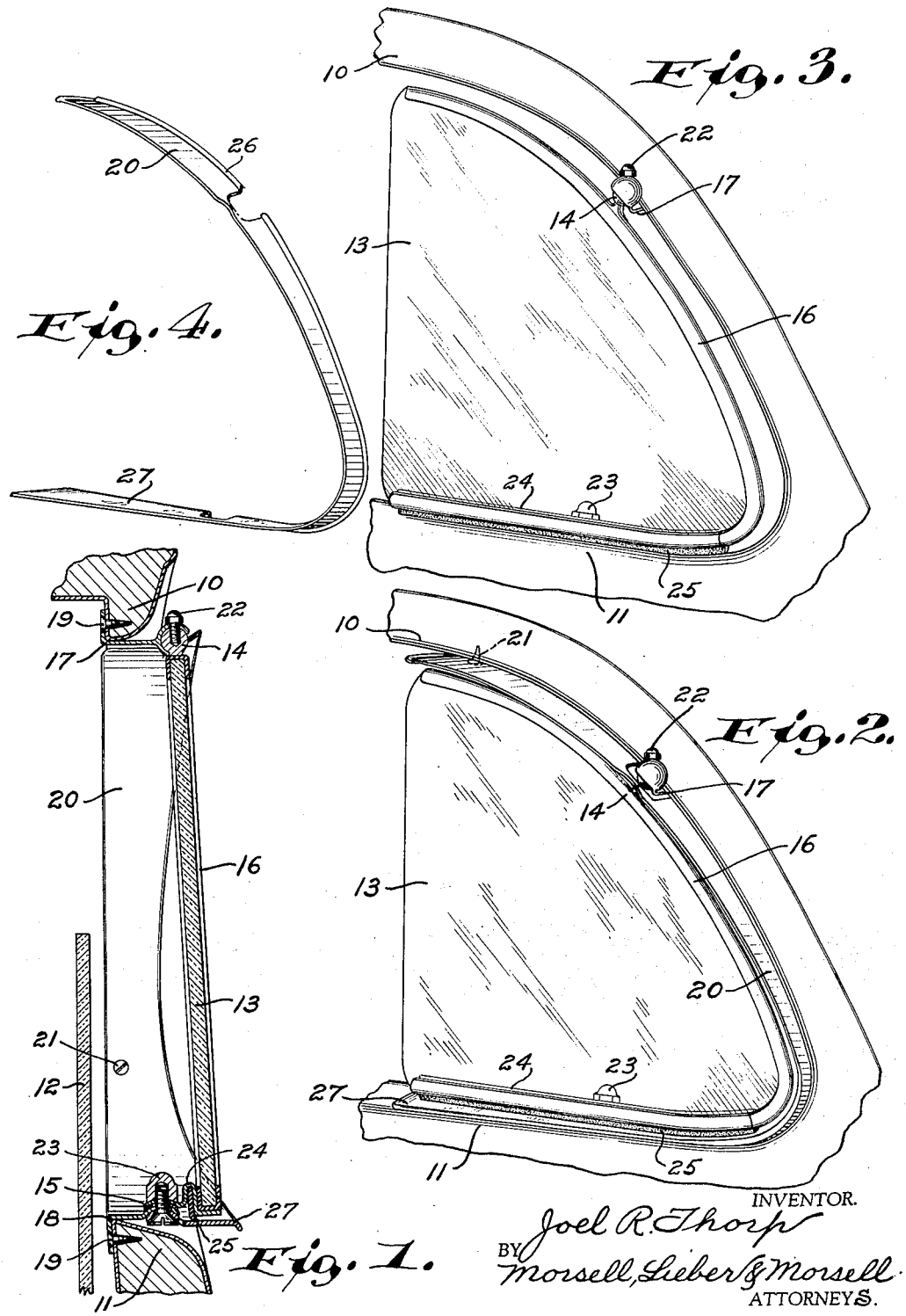

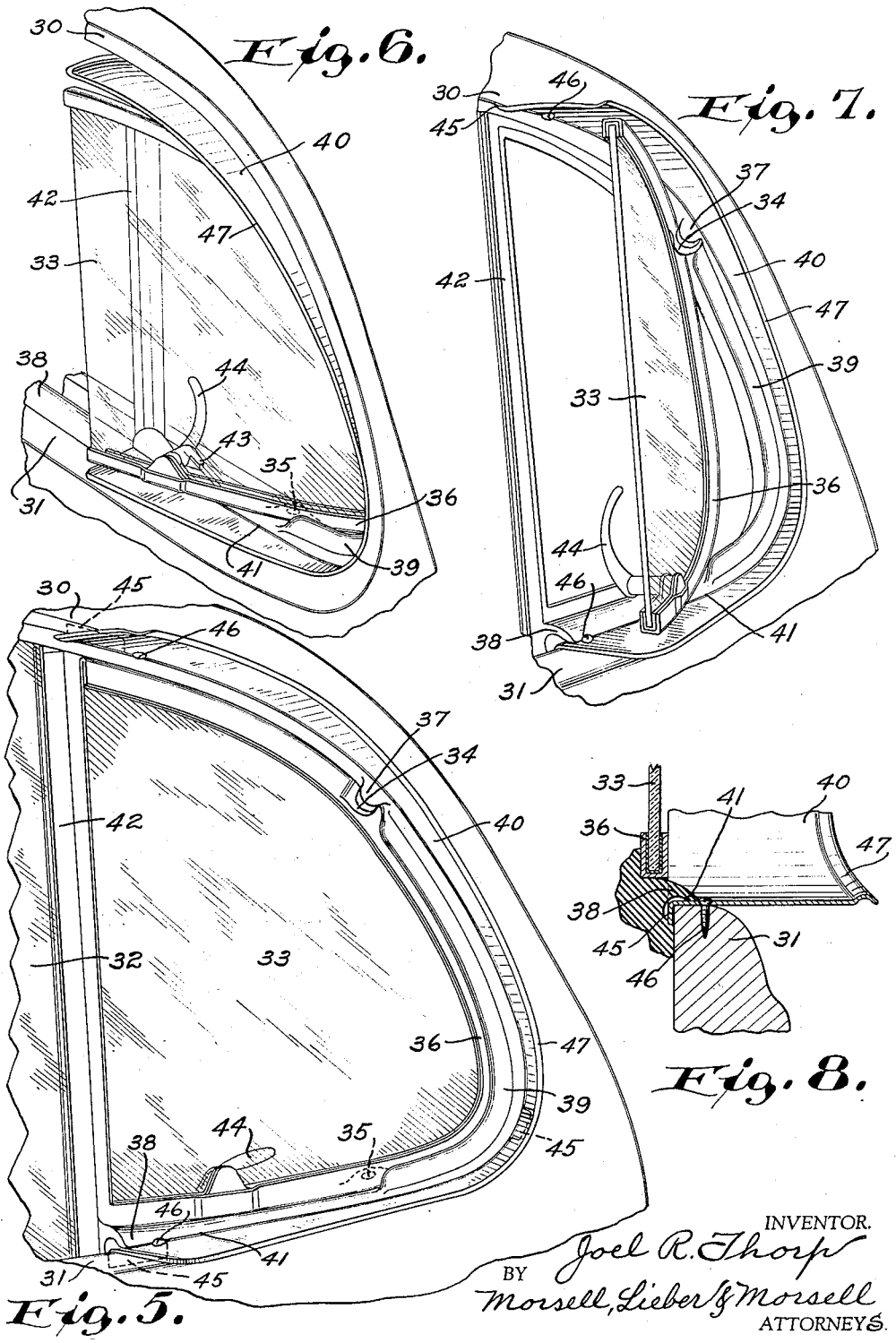

Patented Feb. 15, 1938

2,108,322

UNITED STATES PATENT OFFICE 2,108,322

WEATHER GUARD

Joel R. Thorp, West Allis, Wis., assignor to The Fulton Company, West Allis, Wis., a corporation of Wisconsin Application December 28, 1936, Serial No. 117,756

6 Claims. (Cl. 296—84)

My present invention relates in general to improvements in devices for protecting the occupants of a vehicle against dust and inclement weather, and relates more specifically to an improved weather guard which is cooperable with the adjustable side wing of an automobile or the like to eliminate undesirable draft and to prevent ingress of precipitation and dust.

In general, an object of my present invention is to provide a new and useful weather guard for the side windows of vehicles, which is adapted to co-operate with the ordinary side wing to effectively protect the occupants of the vehicle enclosure.

Many types of so-called side wings or deflector shields which are cooperable with the side windows of automobiles in order to protect the occupants against undesirable draft, have heretofore been placed upon the market. Some of these prior deflector devices are adapted to be applied as accessories to the side windows of various styles of cars, while others are built-in permanently by the manufacturers, and most of the side wings are swingably adjustable about substantially upright axes in order to effect variable ventilation. When the shields are swung outwardly with respect to the adjacent window reveals so as to produce maximum ventilation, the upper and lower edges of the rear portions of these shields are ordinarily disposed outwardly beyond the sides of the vehicle enclosure thereby producing open spaces or passages which permit dust, rain, snow and the like to pass around these shield edges into the enclosure to the annoyance of the occupants. In order to eliminate this objection, some of the built-in wing assemblages have been provided with upper and lower outwardly projecting ledges formed integral with or permanently attached to the adjacent window reveals and cooperable with the wings to prevent production of such openings or passages. As shown and described in prior Patent No. 2,066,590, granted January 5, 1937, it has also been proposed to provide a detachable deflector shield assemblage having its wing supporting bracket formed as a weather guard for eliminating the objectionable open space, and while both of these prior corrective expedients are entirely satisfactory, they are not adapted for use either in conjunction with ordinary unprotected side wings which are permanently attached to the windows, or in cases where it is desirable to apply or to remove the guard without disturbing the wing supports or bearings.

It is therefore an object of my present invention to provide an improved weather guard which is applicable as an accessory to the reveals of the side windows of automobiles or the like, and which is effectively cooperable with the adjustable side wings supported by these reveals to prevent ingress of dust, rain or the like past the upper, lower and forward edge portions of the shield when the latter is swung outwardly.

A more specific object of this invention is to provide a readily applicable weather guard which is adapted to be applied to or removed from a wing protected window, without in any manner disturbing or interfering with the wing mountings or supports.

Another specific object of the invention is the provision of an improved wing and weather guard assemblage, wherein either the wing or the guard may be utilized independently of the other.

A further specific object of the invention is to provide an improved weather guard unit which may be conveniently applied to windows provided with built-in adjustable side wings, and which may be manufactured and sold at moderate cost.

Still another specific object of my invention is the provision of an extremely simple and effective weather guard which may be readily fitted to reveals of odd shapes so as to present a neat and highly finished appearance, and which is not undesirably obstructive.

These and other objects and advantages will be apparent from the following detailed description.

A clear conception of several embodiments of my present invention, and of the mode of constructing and of utilizing weather guards built in accordance therewith, may be had by referring to the drawings accompanying and forming a part of this specification wherein like reference characters designate the same or similar parts in the various views.

Fig. 1 is a transverse vertical section through one type of wing assemblage wherein both the deflector shield and the improved weather guard are independently detachably secured to the window reveals;

Fig. 2 is a front and side perspective view of the assemblage of Fig. 1, showing the deflector shield swung outwardly;

Fig. 3 is a similar perspective view of the assemblage with the improved weather guard removed therefrom and likewise showing the deflector shield swung outwardly;

Fig. 4 is a similar perspective view of the weather guard alone;

Fig. 5 is a rear and side perspective view of another type of wing assemblage wherein the deflector shield is permanently pivotally associated with the window, while the improved weather guard is applicable to the reveals as a detachable accessory;

Fig. 6 is a front and side perspective view of the assemblage of Fig. 5, showing the deflector shield swung open;

Fig. 7 is a rear perspective of the same assemblage showing the shield adjusted to the position shown in Fig. 6; and Fig. 8 is an enlarged transverse vertical section through a fragment of the lower rear portion of the assemblage of Fig. 5.

While I have shown and described my invention as being applied to only two types of side wing assemblages especially applicable to the side windows of streamlined automobiles, it is not the intent to thereby unnecessarily restrict the scope, since the improved weather guard may be more generally applicable to other types of vehicles.

Referring to Figs. 1 to 4 inclusive of the drawings, the side wing and weather guard assemblage specifically shown therein comprises in general a main window having upper and lower relatively inclined and forwardly interconnected reveals 10, 11 respectively and also being provided with the usual vertically adjustable glass 12; a substantially triangular deflector shield 13 conforming in general shape with the forward portion of the window opening and being swingable about upper and lower pivots 14, 15 respectively which in the present case are associated with a nosing strip 16 coacting with the edges of the shield 13; upper and lower pivot brackets 17, 18 respectively both of which are detachably secured directly to the adjacent window reveals 10, 11 by means of screws 19; and a weather guard 20 interposed between the reveals 10, 11 and the shield 13, the guard 20 being detachably secured to the reveals by means of screws 21 independently of the brackets 17, 18.

The window including its reveals 10, 11 and glass 12, are of relatively well known and standard construction, being ordinarily associated with the forward side doors of an automobile. The reveals 10, 11 may be of various shapes and dimensions, and the upper reveal 10 on the modern streamlined cars, is usually curved slightly and connects with the lower straight reveal 11 through an abruptly curved front reveal portion. The glass 12 is vertically adjustable in a plane closely adjacent to the reveals 10, 11 in a well known manner in order to open or close the window opening more or less.

The window wing which comprises the deflector shield 13 and its supporting pivots 14, 15 and brackets 17, 18, may be of the type shown generally in Patents #2,066,589 and #2,066,590, both granted January 5, 1937, except that in the present improvement the weather guard is formed separate from the wing and its mounting. The upper pivot 14 comprises a small sphere secured directly to the nosing strip 16 and coacting with a socket formed in the upper bracket 17, as shown in Fig. 1, and the sphere may be confined within the socket by a cap screw 22. The lower pivot 15 comprises a spherically socketed portion secured to the lower portion of the nosing strip 16 and coacting with a spherical projection on the lower bracket 18, and a retaining screw and nut 23 for holding the parts together. While the axes of the pivots 15, 16 are substantially alined, the upper pivot 15 is disposed substantially in the plane of the shield 13 and the lower pivot 16 is located between the planes of the glass 12 and of the shield 13, thus positioning the shield 13 at a slight angle relative to the common pivotal axis. The lower straight portion of the nosing strip 16, which is swingable in close proximity to the lower reveal 11, is also provided with a recessed portion 24 within which a rubber sealing strip 25 is confined. As previously indicated, the brackets 17, 18 are detachably connected to the adjacent reveals 10, 11 by means of screws 19, or otherwise.

The improved weather guard 20 shown in Figs. 1, 2 and 4, is preferably formed of thin sheet material such as metal, and the upper and lower rearwardly projecting end portions of this guard are widened to prevent formation of open passages or spaces when the deflector shield 13 is swung outwardly at its rear end. The guard 20 is relatively stiff across the widened end portions thereof, but is longitudinally flexible so that it may be readily fitted to the reveals 10, 11, and when the fastening screws 21 are applied, the inner flange 26 of the guard should snugly engage the inner reveal surfaces. The rubber sealing strip 25 should also contact and slide along the upper smooth surface of the lower widened portion 27 of the guard 20, when the shield 13 is adjusted, and if so desired, the sealing strip 25 may be extended throughout the entire length of the nosing strip 16.

When the side wing and weather guard of Figs. 1 to 4 inclusive have been properly applied to a window, the deflector shield 13 may be angularly adjusted about its pivots 14, 15 to any desired position. If the front portion of the shield 13 is moved inwardly, the rear portion thereof swings outwardly, and the weather guard 20 then serves to close the gaps between the upper and lower rear edge portions of the shield 13 and the adjacent portions of the reveals 10, 11. During such adjustment of the shield 13, the sealing strip 25 slides along and in contact with the guard portion 27 so as to maintain a tight joint, and the guard 20 will thus prevent rain, snow, dust or the like from entering the car enclosure around the forward edges of the deflector shield. Due to the separate formation and independent attachment of the deflector shield 13 and weather guard 20, either or both of these elements may be independently applied to or removed from the reveals 10, 11. It may be desirable at times, to remove only the shield 13 with its supporting brackets 17, 18, or at other times it may be found desirable to remove only the weather guard 20, while at other times removal of both may be desired. The present invention as embodied in Figs. 1 to 4 inclusive will obviously permit such removal.

Referring more specifically to Figs. 5 to 8 inclusive, the side window and weather guard assemblage shown therein, comprises in general a main window having upper and lower relatively inclined and forwardly interconnected reveals 30, 31 respectively, the window also being provided with a rear vertically adjustable glass 32 forming a partial closure; a substantially triangular deflector shield 33 conforming in general shape to the forward portion of the window opening to provide a complete closure therefor and being swingable about upper and lower pivots 34, 35 respectively, secured to a nosing strip 36 coacting with the forward edges of the shield 33; upper and lower pivot brackets 37, the upper of which alone is visible, both permanently attached directly to the adjacent reveals 30, 31; a heavy rubber sealing strip 38 permanently attached to the window reveals 30, 31 and cooperable with the nosing strip 36 to insure tight closing of the shield 33, the strip 38 having an integral front stop portion 39 thereon; and a weather guard 40 interposed between the reveals 30, 31 and the shield 33 beneath the flexible lip 41 of the sealing strip 38.

In the embodiment of Figs. 5 to 8 inclusive, the main window including the reveals 30, 31, the glass 32, the deflector shield 33 with its supporting brackets 37, and the rubber sealing strip 38, is standard equipment furnished by the automobile manufacturer. The glass 32 is slidably cooperable with a fixed guide 42, and the shield 33 is swingable about the substantially alined pivots 34, 35 in close proximity to the reveals 30, 31. When the window glass 32 is uppermost, and the shield 33 is positioned as shown in Fig. 5 with the forward portion of the nosing strip 36 against the stop portion 39 and the rear end of the shield 33 in contact with the guide 42, the window opening is closed and sealed. The deflector shield 33 is also provided with a latch 43 and with an actuating handle 44 for effecting release of the latch and angular adjustment of the shield about its pivots 34, 35. In the assemblage as furnished by the manufacturer, the flexible lip 41 of the sealing strip 38 snugly engages the reveals 30, 31 from the upper to the lower end of the guide 42, but this lip 41 may be readily withdrawn from these reveals to permit insertion of thin material.

The improved weather guard 40 of Figs. 5 to 8 inclusive, is therefore preferably formed of thin sheet metal, and the upper and lower rearwardly extending end portions of this guard are again widened to prevent formation of open spaces or passages at the upper and lower rear portions of the deflector shield 33 when the latter is swung open within the guard. While the weather guard 40 is relatively stiff across its widened portions, it is longitudinally flexible so that it may be conveniently fitted into snug engagement with the reveals 30, 31, and the inner edge of the guard 40 is provided with integral local flanges 45 which lie in a common plane and are adapted to coact with the inner side surface of the reveals as indicated in Fig. 5. The guard 40 may be slipped into place between the flexible lip 41 of the sealing strip 38 and the reveals 30, 31, by prying the lip 41 away from the reveals, and may be subsequently fastened to the window with the aid of a few screws 46. The lip 41 will then snugly engage the surface of the adjacent surface of the weather guard 40 and will assist in maintaining the latter in proper position. The outer edge of the weather guard may also be provided with a longitudinal bead 47 in order to additionally stiffen the guard structure, and the guard may obviously be removed upon release of the screws 46 without disturbing the deflector shield 33 or its mounting.

When the weather guard 40 of Figs. 5 to 8 inclusive has been properly applied to a window having a built-in wing or deflector shield 33, the shield 33 may be angularly adjusted about its pivots 34, 35 to any desired position. If the front portion of the shield 33 is moved inwardly, the rear portion swings outwardly, and the weather guard 40 then serves to close the gaps between the upper and lower rear edge portions of the shield 33 and the adjacent portions of the reveals 30, 31. During such angular adjustment of the shield 33, the forward portion of the nosing strip 36 swings inwardly away from the stop portion 39, and the rear upper and lower portions of the nosing strip swing outwardly within the weather guard 40. The adjustment of the shield 33 may be effected with the aid of the handle 44, and when the shield is in closed position, the latch 43 serves to lock the wing against the sealing strip 38. This improved assemblage therefore likewise prevents ingress of dust, and precipitation, into the car enclosure about the upper and lower ends of the deflector shield 33 when the same is open, and as previously indicated, the improved weather guard 40 may be readily applied to the reveals 30, 31, or removed therefrom, without in any manner disturbing the deflector shield 33 or its mountings. It may be stated that the upper bracket 37 is secured to the upper reveal 30 through the sealing strip 38, and the mounting is such that the guard 40 may be applied to the reveal beneath this bracket.

From the foregoing detailed description is will be apparent that the present invention provides an improved weather guard which besides being simple and compact in construction, is also highly efficient in use. The improved weather guard is readily applicable as an accessory either to windows having built-in deflector shields, or to wing assemblages which have been previously applied as accessories. The improved weather guard may be conveniently applied with minimum effort, and may be just as readily removed, without disturbing the side wing or its mounting. The weather guard is moreover neat in appearance and can be manufactured and sold at moderate cost, and the invention has proven highly successful in actual commercial use.

It should be understood that it is not desired to limit the present invention to the exact details of construction and to the precise mode of use herein shown and described, for various modifications within the scope of the claims may occur to persons skilled in the art.

I claim:—

1. In combination with a window having upper and lower forwardly interconnected reveals, a deflector shield having upper and lower forwardly interconnected edge portions swingable in close proximity to the reveals, brackets swingably supporting said shield directly from said reveals, and a weather guard cooperable with said shield edge portions and being secured to said reveals independently of said brackets, said guard being applicable to or removable from said reveals without disturbing said shield supporting brackets.

2. In combination with a window having upper and lower relatively inclined and forwardly interconnected reveals, a deflector shield having upper and lower relatively inclined and forwardly interconnected edge portions swingable about an axis and in close proximity to the reveals, upper and lower brackets pivotally supporting said shield directly from said reveals, and a weather guard cooperable with said shield edge portions and being attached to said reveals independently of said brackets, said guard being applicable to or removable from said reveals without disturbing said upper and lower brackets.

3. In combination with a window having upper and lower relatively inclined and forwardly interconnected reveals, a deflector shield having upper and lower relatively inclined and forwardly interconnected edge portions swingable about an axis and in close proximity to the reveals, upper and lower brackets pivotally supporting said shield directly from said reveals, and a unitary weather guard interposed between said shield edge portions and said reveals and being detachably secured to the latter independently of said brackets, said guard being applicable to or removable from said reveals without disturbing said upper and lower brackets.

4. In combination with a window having upper and lower relatively inclined and forwardly interconnected reveals, a substantially triangular deflector shield having edge portions swingable in close proximity to the reveals, means pivotally suspending said shield directly from said reveals, and a thin longitudinally flexible weather guard interposed between said reveals and the adjacent edges of said shield, said guard being applicable to or removable from said reveals without disturbing said pivot means.

5. In combination with a window having upper and lower relatively inclined and forwardly interconnected reveals, a substantially triangular deflector shield having edge portions swingable in close proximity to the reveals, means pivotally suspending said shield directly from said reveals, and a thin longitudinally flexible weather guard interposed between said reveals and the adjacent edges of said shield, said guard being applicable to or removable from said reveals without disturbing said pivot means and being deflectable to snugly conform to the shape of said reveals.

6. In combination with a window having upper and lower forwardly interconnected reveals, a deflector shield having upper and lower forwardly interconnected edge portions swingable in close proximity to the reveals, means for pivotally supporting said shield directly from said reveals, a weather guard supported from said reveals independently of said pivot means, and a sealing strip carried by said shield and slidable over said guard.

JOEL R. THORP.